United States Patent [19]

Lowell

[11] 3,972,980

[45] Aug. 3, 1976

[54] PROCESS REMOVING SULFUR DIOXIDE FROM GASES

[75] Inventor: Philip S. Lowell, Austin, Tex.

[73] Assignee: Radian Corporation, Austin, Tex.

[22] Filed: July 31, 1974

[21] Appl. No.: 493,340

[52] U.S. Cl............................... 423/242; 423/166
[51] Int. Cl.$^2$.......................................... C01B 17/00
[58] Field of Search ............ 423/242, 244, 512, 166

[56]  References Cited
UNITED STATES PATENTS

| | | | |
|---|---|---|---|
| 2,090,142 | 8/1937 | Nonhebel et al. | 423/242 |
| 2,090,143 | 8/1937 | Nonhebel et al. | 423/242 |
| 3,708,266 | 1/1973 | Gustavsson | 423/242 |

Primary Examiner—Oscar R. Vertiz
Assistant Examiner—Gregory A. Heller
Attorney, Agent, or Firm—Browning & Bushman

[57]  ABSTRACT

A sulfur dioxide containing gas stream is passed through a gas scrubber through which is circulated a scrubbing medium, preferably slurried, containing a reactant which reacts with the sulfur dioxide to produce sulfites and/or sulfates, a portion of which precipitate. At least a portion of the precipitated sulfites and/or sulfates are removed from the scrubbing medium which is rejuvenated with fresh reactant to maintain substantially steady state conditions in the scrubber. To minimize scaling in the scrubbing system, seed crystals of the sulfites and/or sulfates are introduced into the scrubbing medium, the seed crystals being in number and size so as to control the level of supersaturation of the scrubbing medium with respect to the sulfites and/or sulfates.

17 Claims, 3 Drawing Figures

PROCESS REMOVING SULFUR DIOXIDE FROM GASES

BACKGROUND OF THE INVENTION

The present invention relates to the liquid washing of gases containing sulfur dioxide and, more particularly, to a process and apparatus for such washing which results in minimum scaling in the washing system.

The combustion of fossil fuels such as coal and oil results in the production of sulfur dioxide from oxidation of the naturally occurring sulfur in the fossil fuel. Sulfur dioxide is a particularly noxious air pollutant and, accordingly, power generating plants and other large users of fossil fuels are constantly looking for methods of removing the sulfur dioxide from the flue gases. One method which has proven quite effective involves washing the sulfur dioxide laden waste gases with a slurry of an alkaline metal carbonate, oxide, or hydroxide such as a lime or limestone slurry or a magnesium oxide slurry. However, the use of such a wet scrubbing system presents certain problems, a major one being scaling of the equipment surfaces with the metal sulfate and/or sulfite such as gypsum (calcium sulfate) and/or calcium sulfite. Indeed, in certain cases the scaling can become so severe on the scrubber surfaces and the attendant equipment that shutdown of the system is necessitated because of curtailed gas or liquid flow. Another problem connected with such wet scrubbing processes is that the solid sulfite and/or sulfate produced in the scrubber has a particle size which makes it difficult to dewater or otherwise process.

The reaction of sulphur dioxide with lime, limestone or similar substances in a wet scrubbing operation results, in part, in the formation of crystalline metal sulfite, e.g. calcium sulfite, along with dissolved sulfite. Since oxygen is generally present in any such wet scrubbing system, there is resultant oxidation of dissolved sulfite, part of which ends up as crystalline, substantially insoluble metal sulfate, e.g. calcium sulfate, a species which can also cause scaling.

It is well known that both calcium sulfate and calcium sulfite will form supersaturated solutions. It is also known that in highly supersaturated solutions, spontaneous nucleation takes place, which, while ultimately leading to the formation of crystalline precipitants of the sulfite and sulfate facilitating their removal from the system, also leads to scaling i.e. plating out on the equipment surfaces. In other words, if the driving force for crystallization becomes high enough in a highly supersaturated solution of sulfite/sulfate, the capacity of the circulating medium to hold the sulfite or sulfate in a harmless form, i.e. in solution or as a precipitate on circulating solids, is exceeded and crystallization on the scrubber system surfaces occurs.

Numerous methods have been proposed to cope with the problem of scaling in lime/limestone wet scrubbing systems. The problem has been treated extensively in the literature. See, for example, Slack A. V., REMOVAL OF SULFUR DIOXIDE FROM STACK GASES BY SCRUBBING WITH LIMESTONE SLURRY: OPERATIONAL ASPECTS OF THE SCALING PROBLEM, Prepared for Presentation at the Second International Lime/Limestone Wet Scrubbing Symposium Sponsored by the EPA, New Orleans, Louisiana, Nov. 8–12, 1971. In addition, U.S. Pat. Nos. 2,090,142 and 2,090,143 to Nonhebel et al describe processes for preventing scale formation in the scrubbing processes under consideration. Basically, the processes described in those patents involve subjecting the scrubbing medium leaving the scrubber to a delay time long enough to enable desupersaturation of the liquor by permitting substantially complete crystallization of the reaction products, and by controlling the scrubbing medium flow rate such that the extent of supersaturation existing in the scrubbing medium leaving the scrubber does not exceed certain critical values. Not only do the processes described in the Nonhebel et al patents require extremely large hold tanks to achieve the requisite delay time but, moreover, the surfaces of the scrubbing equipment must be constructed of certain types of materials.

It is well known that desupersaturation of a solution can be accomplished by contact with crystals of the salt with respect to which the solution is supersaturated. However, the mere presence in a lime/limestone scrubbing system of high concentration of solid sulfite/sulfate in the circulating scrubbing medium to thereby provide a surface on which dissolved sulfite and sulfate can preferentially precipitate has not been proven to be satisfactory in terms of preventing scaling. Indeed, it has been found that in scrubbing systems of the type under consideration, supersaturation and resultant scaling can occur on the scrubbing surfaces even when the concentration of suspended calcium sulfite and sulfate are greater than 5% each. Thus, while it has been suggested that seeding will effect desupersaturation and minimize scaling, the methods heretofore employed have not been successful.

The present invention is based upon the observation that the controlled introduction of seed crystals into the system in such a fashion that process particle balance is maintained will result in positive prevention of scale and control of the solid waste particle size distribution. This controlled introduction of seed crystals is accomplished by a process and means other than uncontrolled spontaneous nucleation within the system, i.e. uncontrolled chemical precipitation, or by indiscriminate seed crystal generation by a mechanical means within the system. In the latter respect, U.S. Pat. No. 3,708,266 to Gustavsson discloses an apparatus for removing sulfur dioxide from flue gases in which the total circulating slurried absorbant is passed through a grinding mill which removes the sulfite/sulfate layer from the surface of the active carbonate particles, the rejuvenated carbonate particles being returned to the scrubber. The Gustavsson system can, for practical purposes, be considered uncontrolled seed crystal generation much like the uncontrolled chemical precipitation which occurs via spontaneous nucleation.

SUMMARY OF THE INVENTION

It is, therefore, an object of the present invention to provide an improved system and method for the removal of sulfur dioxide from gas streams.

Another object of the present invention is to provide a system and process for the removal of sulfur dioxide from gas streams in which scaling due to sulfite and/or sulfate crystallization is minimized.

Still another object of the present invention is to provide a system and method for the removal of sulfur dioxide from gas streams in which the size distribution of the product crystals can be controlled.

These and other objects of the present invention will become apparent from the drawings, the description given herein, and the appended claims.

The present invention deals with the controlled introduction of seed crystals into the system so that spontaneous nucleation can be minimized or eliminated and the process particle balance in the system maintained. In the process herein described, the sulfur dioxide laden gas is passed through a scrubbing zone in which a scrubbing medium, preferably, although not necessarily, slurried, containing a reactant which reacts with sulfur dioxide to form sulfites and/or sulfates, is being circulated. Seed crystals of a number and size so as to control the level of supersaturation with respect to sulfites and/or sulfates below some predetermined level so as to avoid scaling are introduced, preferably by in stream generation into at least a fraction of the scrubbing medium. Make-up water and scrubbing medium reactant are introduced to control the composition of the scrubbing medium and a portion of the circulating solids are removed from the system by purging a portion of the scrubbing medium.

The system of the present invention includes a gas-liquid scrubber through which the gas to be cleaned is passed. The scrubber has an inlet and an outlet and means are provided for passing the scrubbing medium through the scrubber and for introducing seed crystals into a circulation path of at least a fraction of the scrubbing medium, there being provided, in addition, means for controllably generating said seed crystals in number and size so as to control the level of supersaturation, with respect to sulfites and/or sulfates, in at least the fraction of the scrubbing medium to which the seed crystals are added below some predetermined level. The system further includes means for removing at least a portion of the precipitated sulfite and/or sulfate and means for controlling the composition of the scrubbing medium with respect to the liquid and the reactant in the scrubbing medium.

DESCRIPTION OF THE PREFERRED EMBODIMENT

Figure 1:
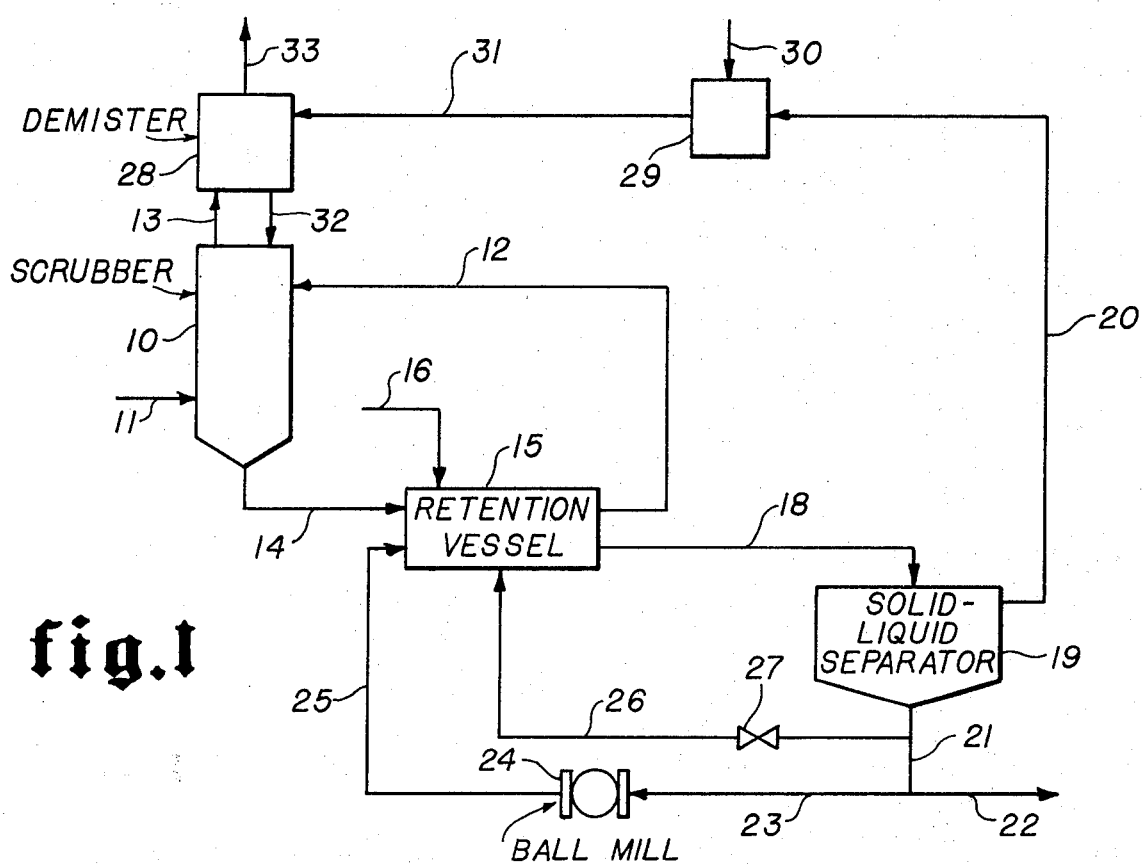
FIG. 1 is a diagrammatic view of one embodiment of the system and process of the present invention.

The reaction between sulfur dioxide and a lime or limestone slurry results in the production of solid calcium sulfite. The presence of air or oxygen leads to oxidation of the soluble sulfite and the consequent formation of solid calcium sulfate, both the sulfite and sulfate being potential scaling species.

In a typical lime or limestone scrubbing process for the removal of sulfur dioxide from a gas stream, the scrubbing medium is supersaturated with respect to calcium sulfite and/or calcium sulfate. Once the driving force for crystallization reaches a certain level, the dissolved sulfite and sulfate precipitate out of solution. If the nature of the circulating particles is such as to permit this crystallization to occur on the surface of those particles, the crystallizing sulfite and sulfate are maintained in a harmless form and can be removed from the system as solid sulfite/sulfate, and scaling is prevented. The degree of supersaturation at which the driving force exceeds the capacity of the in situ mechanisms to prevent scaling is called the critical degree of supersaturation. As the literature demonstrates, if scaling is to be avoided, the critical degree of supersaturation must not be exceeded. See Lowell, P.S., USE OF CHEMICAL ANALYSIS AND SOLUTION EQUILIBRIA IN PREDICTING CALCIUM SULFATE/SULFITE SCALING POTENTIAL, Paper 8e, Prepared for Presentation at the Second International Lime/Limestone Wet Scrubbing Symposium Sponsored by the EPA, New Orleans, Louisiana, Nov. 8–12, 1971.

It will be recognized that in the usual lime or limestone scrubbing system, some random generation of seed crystals of calcium sulfite and calcium sulfate occurs. However, the generation of these seed crystals is via an uncontrolled manner primarily by spontaneous nucleation. Reliance on spontaneous nucleation for seeding to desupersaturate the solutions is disadvantageous from several points of view. Spontaneous nucleation conditions are generally close to conditions leading to scaling, i.e. it requires levels of supersaturation above that necessary for precipitation on existing seed crystals. Accordingly, any attempt to rely on spontaneous nucleation to produce sufficient seed crystals without scaling would require a level of control over operating parameters which, for practical purposes, is unattainable. Furthermore, in spontaneous nucleation the number of particles produced is uncontrolled and may become excessive. It will be recognized that most of the sulfur dioxide removed from the gas stream must be disposed of as solid metal sulfite or sulfate. For example, in either the case of calcium sulfite or sulfate the average mass of the particle is approximately equal to the weight rate of sulfur removal calculated as sulfite or sulfate, divided by the generation rate of the particle. Therefore, the generation of excessively large numbers of particles of either sulfite or sulfate produces a solid waste product having a small average particle size. Such a waste product makes disposal difficult because it is difficult to dewater and leads to a by-product unsuitable for such uses as land fill.

On the other hand, insufficient introduction of seed particles via spontaneous nucleation or other means results in a small number of large particles being present in the system which, accordingly, provide too little surface area to avoid the critical level of supersaturation. While this may be controlled to some extent by resorting to excessively large hold tanks such as suggested in the Nonhebel references, the process still remains largely uncontrolled and subject to scaling resulting from relatively minor variations in process conditions.

By employing controlled introduction of seed crystals to maintain the proper process particle balance, supersaturation levels necessary for spontaneous nucleation can be avoided in the scrubbing system which will, in turn, minimize scale formation and lead to the production of a solid waste having a larger, more favorable particle size distribution.

To more fully demonstrate the invention, reference is made to the accompanying Figures. Turning first to FIG. 1, the gas stream to be scrubbed enters scrubber 10, which can be any conventional gas-liquid contactor, but which is preferably a spray scrubber and in the embodiment depicted is a countercurrent scrubber, via line 11 and is contacted by the scrubbing medium entering scrubber 10 via line 12. The gas stream, with a substantially lower sulfur dioxide content, exits scrubber 10 via line 13 and passes into demister 28, being vented through line 33. The demister 28 can be of any type including a wet electrostatic precipitator. The scrubbing medium leaves scrubber 10 via line 14 and passes into retention vessel 15 which also serves as a precipitator to convert the sulfur removed in scrubber 10 into solid materials. Make-up scrubbing medium comprising aqueous lime or limestone slurry is added to vessel 15 via line 16, the amount and composition of make-up scrubbing medium added being controlled with respect to the amount of sulfur dioxide being removed from the gas stream. The scrubbing material from retention vessel 15 is circulated via line 12 back to scrubber 10.

A part of the scrubbing medium is removed from retention vessel 15 in a purge stream via line 18 and sent to a solid-liquid separator 19 which can be a thickener, filter, centrifuge or other commonly employed solid-liquid separating means and which effects a separation of the purge stream into a solid-rich fraction and a liquid-rich fraction. The liquid-rich fraction, primarily water, is sent, via line 20 to demister wash water recycle vessel 29. Demister wash liquid from recycle tank 29 including any make-up water added via line 30 enters demister 28 from line 31 and is eventually returned to scrubber 10 through line 32. Portions of the liquid-rich stream may, if desired, be recycled to scrubber 10 to supply make-up water for the scrubbing medium. The solid-rich fraction from separator 19 is removed via line 21 and divided into three streams. A purge stream passes via line 22 to waste. A second portion of the solid-rich fraction from separator 19 passes via line 23 to a wet ball mill 24 which grinds the solids from separator 19 returning the thus ground material, i.e. the seed crystals, via line 25 into retention vessel 15. It will be apparent that the number of particles or seed crystals leaving ball mill 24 via line 25 will be greater than that entering ball mill 24 via line 23 depending on the extent of grinding occurring therein. Depending on the solids content of the scrubbing medium, a third stream can ultimately be recycled to the system via line 26 containing valve 27 into retention vessel 15. The amount of material, if any, recycled via line 26 will be such as to aid in maintaining the particle balance in the system.

Figure 2:
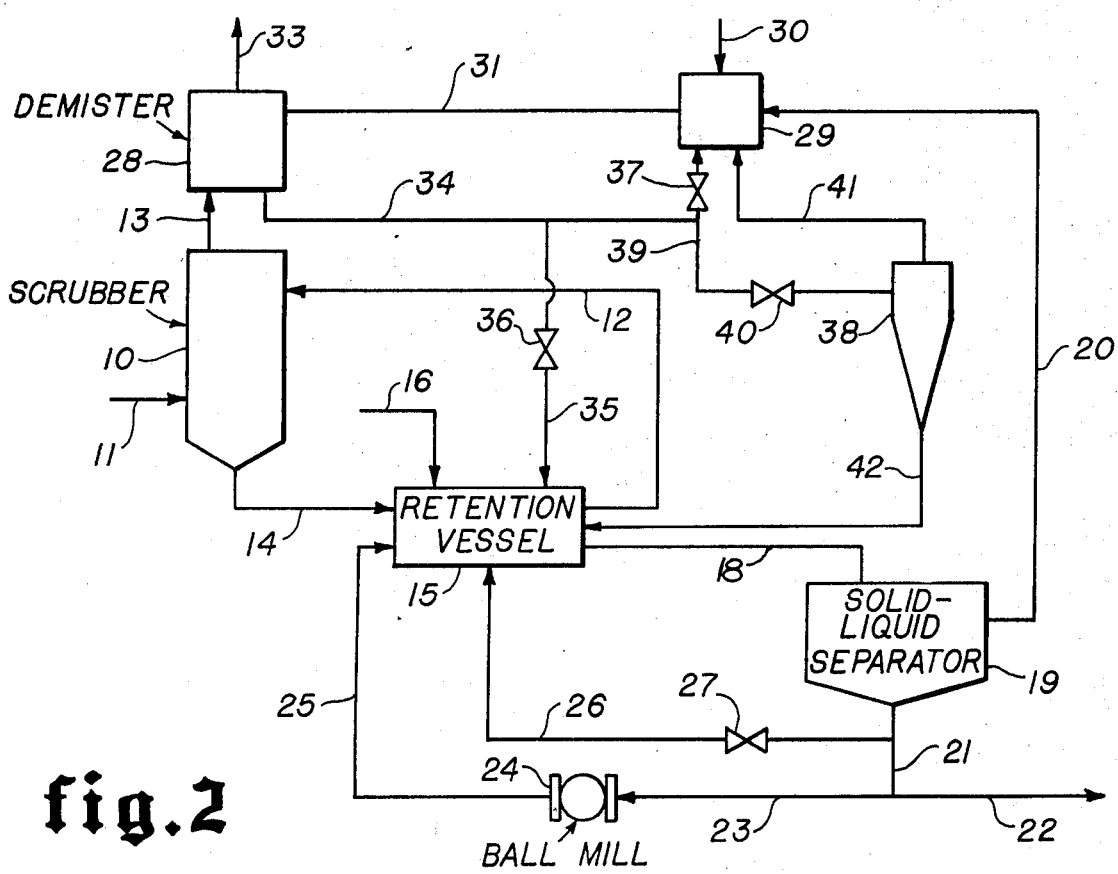
FIG. 2 is a diagrammatic view of a second embodiment of the system and process of the present invention.

The embodiment shown in FIG. 2 is substantially the same as that shown in FIG. 1 with the exception that the demister wash water is partially recirculated rather than being returned, in toto, to scrubber 10 and eventually to retention vessel 15. In the embodiment of FIG. 2 the demister wash water effluent leaves demister 28 via line 34 and is recycled to recycle tank 29 through valve 37. A portion of the effluent wash water in line 34 is returned through valve 36 and line 35 to retention vessel 15. If desired, a portion of the effluent can be sent to cyclone 38 via line 39 and valve 40, the overflow from cyclone 38 passing via line 41 to tank 29, the underflow, containing entrained solids, passing via line 42 to vessel 15. By proper adjustment of valves 36, 37 and 40, relative flow to vessels 15 or 29 can be completely directed.

As noted, the invention involves a particle balance and, specifically, a particle balance in the system to maintain steady state conditions. Steady state conditions require the particle generation rate in the system be equal to the particle removal rate from the system. Expressed mathematically:

$$X + p_{S1}L_2(n_2 - n_1) = p_{S1}L_1 n_1$$

Where:
$X$ is the rate of uncontrolled particle generation
$L_1$ (vol/unit time) is the flow rate through line 22
$L_2$ (vol/unit time) is the flow rate through line 23
$p_{S1}$ (wt/vol) is the seed slurry concentration
$n_1$ is the number of particles per unit weight of solids entering ball mill 24
$n_2$ is the number of particles per unit weight of solids leaving ball mill 24

Rearrangement of the above equation and neglecting the value of X, which for a well controlled process is small relative to the other terms, gives the following relationship:

$$L_2/L_1 = \frac{1}{(n_2/n_1) - 1}$$

Thus, the ratio of the material sent to the ball mill to the material removed from the system, i.e. $L_2/L_1$, is dependent upon the grinding efficiency. For highly efficient grinding ($n_2/n_1$ is large) only a small relative amount of material need be ground ($L_2/L_1$ is small), and vice-versa. Thus, the provision in the process of controlled seed crystal generation will permit the maintenance of a steady state particle balance in the system, which will, in turn, avoid a critical degree of supersaturation.

In the embodiments described above, seed crystals are introduced into retention vessel 15. As a practical matter, in most wet scrubbing processes for removing $SO_2$ from gaseous streams, the scrubbing medium retention vessel is the only place in the process where significant amounts of desupersaturation will take place because of relatively long residence times and the presence of existing seed crystals. Thus, by controlling the supersaturation in or near the retention vessel, scaling will be substantially prevented in the system. However, depending upon the configuration of the system or the type of equipment used, it may be necessary to introduce seed crystals at other points in the system to effect non-scaling desupersaturation. For example, in the embodiment shown in FIG. 2 wherein the demister wash water is partially recirculated rather than returning, in toto, to scrubber 10, the possibility exists that scaling can occur in the wash water recycle loop. It will be understood that if the $SO_2$ removal in scrubber 10 is incomplete either because of inefficient scrubbing or because of a temporarily excessively high $SO_2$ content in the gas being scrubbed, some $SO_2$ will pass via line 13 into demister 28. Since the demister wash water is a fraction of the scrubbing medium in the sense that at least part of the demister wash water, at one time, was part of the scrubbing medium being circulated through scrubber 10, it will contain some of the reactive species which combine with the $SO_2$ to form the solid sulfites and/or sulfates. Under such circumstances, the conditions for scaling can develop. The scaling problem in the demister is, at least partially, controlled by the fact that the wash water is relatively dilute with respect to the reactive species which combine with the $SO_2$ to form sulfites and/or sulfates. Nonetheless, in certain types of demisters or wet precipitators, or under certain process conditions, as, for example, where the wash water was recirculated with little purging, scaling could occur because the concentration of the scale forming species, e.g. $Ca^{++}$, $SO_3^=$ or $SO_4^=$ will build up. Since the inlet concentration of make-up water to the demister is partially controlled by desupersaturation in the retention vessel, the prevention of scale in the demister may be controlled within limits by the particle balance elsewhere in the scrubbing medium circulating system.

Thus, in any part of the system in which there is being circulated any fraction of the scrubbing medium, i.e. scrubbing medium per se or a wash or recycle liquid derived from the scrubbing medium and which contains at least some of the reactive species, seeding as per the method of the present invention may be necessary to avoid scaling.

As noted above, the seed crystals which are introduced into a circulation path of the scrubbing medium or any fraction thereof are in number and of a size so as to control the level of supersaturation in at least that circulation path below some predetermined level. Thus, if grinding is the technique employed for seed crystal generation, the desired degree of grinding, i.e. particle size obtained, and the amount of material ground will be dependent upon the supersaturated level of the scrubbing medium. In practice, in carrying out the process of the present invention, the level of supersaturation with respect to sulfite and/or sulfate in the particular circulating path of the scrubbing medium or any fraction thereof is determined. This determination is preferably made on the scrubbing liquor leaving the retention vessel, i.e. at some point between the outlet of the retention vessel and the inlet of the scrubber. The determination of the level of supersaturation can be accomplished by well known methods. For example, in the case of calcium sulfite, a chemical analysis of the solution can be made. From this analysis the activities of the calcium and sulfite ions may be calculated in a manner described in the literature. See Lowell, P. S., et al, PB-193,029, A THEORETICAL DESCRIPTION OF THE LIMESTONE INJECTION-WET SCRUBBING PROCESS, June 9, 1970, Presented to the National Air Pollution Control Administration, Department of Health, Education and Welfare under Contract CPA-22-69-138. This same technique can then be used to calculate the solubility product constant for calcium sulfite from measurements made on an equilibrium system. Once the solubility product constant is obtained, the level of supersaturation of the scrubbing medium with respect to calcium sulfite can be ascertained. Similar techniques can be employed to determine the level of supersaturation with respect to calcium sulfate or other solids. Thus, the circulation path of the scrubbing medium or a fraction thereof could be monitored, in which case, the degree of supersaturation would be known. In such a system, the measurement could be used to activate the seed crystal generating system when the critical predetermined level of supersaturation was indicated. Continuous monitoring to ascertain the level of supersaturation may be carried out if desired. It has been found that for calcium sulfate in a scrubbing system in which no scaling inhibitors, i.e. additives, have been introduced, the seed crystal generation should be such that the level of supersaturation of calcium sulfate in the medium leaving the saturation vessel does not exceed about 1.2 times saturation concentration. Levels of supersaturation for other scale forming species, e.g. $CaSO_3$, will, of course, differ. In all cases, however, the level at which incipient scaling occurs can be predetermined.

In the process described above, controlled generation of the seed crystals is accomplished by grinding a portion of the solids being removed from the scrubbing medium. Other methods of effecting controlled seed crystal generation can be employed. For example, a slip stream could be removed from the circulation path of the scrubbing medium between the retention vessel and the scrubber, and a mechanical grinding system installed to effect particle generation from the solids contained in the slip stream. Controlled seed crystal generation can also be accomplished chemically as, for example, by the addition of a soluble alkaline earth metal salt, such as calcium chloride, and/or a soluble sulfite or sulfate salt as, for example, sodium sulfite. The resulting slurry of sulfite/sulfate crystals could be fed to supersaturated portions of a circulation path of the scrubbing medium or any fraction thereof to replace the large product crystals. Alternately, a portion of the sorbent feed could be added in such a place or manner in the system so that chemical nucleation results. The remainder would be added in a non-nucleating manner and again controlled introduction of particles into the system would result. Other forms of chemical nucleation or seed crystal generation can also be employed.

It should be noted that when a mechanical grinding system is employed, numerous such devices other than the above described ball mill are suitable. Examples include rod mills, tube mills, compartment mills, pebble mills, disc attrition mills or, for that matter, any of numerous mechanical devices commonly used for effecting crushing or grinding of particulate solids. It will also be appreciated that techniques such as ultrasonics can be employed to effect the desired seed crystal generation. In general, any addition of mass, momentum, or energy to accomplish controlled introduction of seed crystals could be used.

While the system has been described with reference to a lime or limestone slurried scrubbing medium, it will be apparent that the invention has application wherever a material containing a reactant such as an alkaline earth metal carbonate, an alkaline earth metal hydroxide, an alkaline earth metal oxide, or mixtures of such are employed in an aqueous scrubbing medium. Thus, for example, the scrubbing medium can comprise aqueous slurries of quick or slaked lime, limestone, lime/limestone, dolomite, magnesium carbonate, magnesium hydroxide, marl, magnesium oxide, e.g. magnesia scrubbing process in which the sorbent is regenerated, or mixtures of any of the aforementioned. It is to be understood that the reactant in the scrubbing medium can be in a pure form, e.g. calcium carbonate, or can be a constituent of a material as, for example, limestone which is primarily calcium carbonate, but which may contain other components. Thus, it will be recognized that numerous naturally occurring substances can be employed in formulating the scrubbing medium. The process herein also can be employed in gas scrubbing processes such as the sodium based double alkali process in which the scrubbing medium passing through the gas-liquid contactor is substantially a solution. In the aforementioned process, which employs an alkali metal hydroxide such as sodium hydroxide in the gas-liquid contactor, the solid sulfites and/or sulfates are formed in the retention vessel by the addition of a material such as limestone, i.e. calcium carbonate. Accordingly, primarily soluble sulfites are present in the scrubbing medium in the gas-liquid contactor. The solids which are precipitated in the retention vessel are removed from the system and the substantially solid-free scrubbing medium containing the caustic is recycled to the gas-liquid contactor.

Generally speaking, the reactant in the scrubbing medium, e.g. the lime, limestone, etc., will be present in amounts ranging from about 0.05 to about 4.0 percent by weight of the scrubbing medium. It will be understood that a slurried scrubbing medium will contain both dissolved and undissolved species of the reactant and will, in addition, contain both dissolved and undissolved sulfites and/or sulfates produced by the reaction in the scrubber. In general, the scrubbing medium, when a slurry, will have a suspended solids content ranging from about 2 to about 20 percent by weight of the slurry, the majority of which is precipitated sulfite and/or sulfate.

As noted above, numerous types of gas-liquid contactors can be employed in practicing the process of the present invention. For example, vertical countercurrent spray-type scrubbers or crossflow horizontal scrubbers may be employed. Conditions in the scrubber such as flow rate of the scrubbing medium, temperature, etc., will depend upon factors such as the $SO_2$ content, moisture content and feed rate of the gas being scrubbed, the type of scrubber employed, the type of scrubbing medium, etc. In general, when the scrubbing medium comprises a slurried aqueous limestone medium and the scrubber is a counterflow spray-type scrubber, it has been found preferable that temperatures in the scrubber be from about 30° to about 70°C with the feed rate (weight/unit time) of the scrubbing medium being from about 10 to about 40 times the flow rate of the gas through the scrubber. Such conditions have been found to work satisfactorily for flue gases derived from conventional fossil fuels wherein the $SO_2$ content does not exceed 4000 ppmv.

When a lime or limestone scrubbing medium has the above general composition and generation of the seed crystals involves a utilization of a portion of the solid waste from the solid-liquid separation zone, it has been found that the weight ratio of the portion of the solid-rich fraction subjected to grinding to the portion of the solid-rich fraction which goes to waste, i.e. purged from the system, should be from about 1 to 1 to about 1 to 30. Higher ratios of solids ground to solids discharged to waste result in seed crystals which are too fine resulting in a waste product having a particle size distribution which is too small to conveniently dewater. Moreover, a fine by-product is generally unsuitable for land fill or other such uses. It has been found desirable that the seed crystals generated by grinding have an average size ranging from about 5 to about 40 microns. Such a size ensures adequate total particle surface area to prevent a critical degree of supersaturation from occurring and results in a solid waste product having good particle size distribution.

Thus far, the invention has been described in relation to the use of seed crystals comprising a solid sulfite and/or sulfate of the type formed in the scrubber by reaction of the sulfur dioxide with the slurried scrubbing medium. It is possible to employ other seed crystals of differing composition, provided the seed crystals or particulate matter are of a nature which will effect non-scaling precipitation of the sulfite and/or sulfate from the solution. It will be appreciated that when other such materials are used as seed crystals, their number and average size to achieve the desired result, i.e. control the supersaturation with respect to sulfite and/or sulfate, may vary considerably from those employed when sulfite and/or sulfate seed crystals are employed. Thus, for example, physiochemical attractive forces between the solvated sulfite and/or sulfate and the particular seed crystals chosen could very easily change the amount of such seed crystal which need to be added. Lastly, it will be recognized that whereas one type of seed crystal would be effective when a scrubbing medium containing a certain sorbent was employed, the same seed crystal may prove ineffective if the sorbent is changed. It is, however, well within the skill of the art to determine, for a given scrubbing system containing a given sorbent, which such seed crystals would be suitable and what their relative size and number should be.

While reference has been made above to a retention vessel, it should be understood that an actual vessel need not be employed. Rather, the retention vessel may take any form that allows contact time between solid and liquid, such as enlarged piping. The retention vessel serves not only as a convenient method of introducing make-up scrubbing medium, but also provides a delay time to aid in dissipation of the supersaturation in the scrubbing medium. The delay time will, of course, depend upon the circulation rate of the scrubbing medium, the volume of the retention vessel, the concentration of the scrubbing medium, the precipitation rate required, and other such parameters.

It is within the scope of the present invention to employ chemical additives which aid in preventing scale formation. It will be recognized, however, that the use of such additives normally changes the kinetics of the crystallization process of the sulfite and/or sulfate. Accordingly, the level of supersaturation which must not be exceeded if scaling is to be avoided will not necessarily be the same as that in a system in which no such additives are present. Thus, the extent of seed crystal generation and the size of the particles generated will vary depending on the additive used. Floculating agents can also be used to aid in the solid-liquid separation step. Such agents may likewise alter the system in the manner described above in connection with scale prevention additives.

To further illustrate the invention, the following non-limiting example is presented:

EXAMPLE

The system employed in this example was basically the same as that shown in FIG. 2 in which the wash water to the demister was partially recirculated. The scrubber was a counterflow spray scrubber operated under the following conditions:

| | |
|---|---|
| Feed rate of scrubbing medium through scrubber | 10,600 lbs/min |
| Gas feed rate | 500 lbs/min |
| Temperature | 50°C |

The scrubbing medium was an aqueous limestone slurry having the following initial characteristics:

| | |
|---|---|
| pH | 6.0 |
| $CaCO_3$ | 10 grams/liter |

The gas scrubbed was a flue gas from a coal fired boiler containing 2000 ppm by volume $SO_2$. A purge stream of approximately 135 lbs/min was removed from the retention vessel and sent to a clarifier (solid-liquid separator). Under steady state operations, approximately 60 lbs/min of a solids-rich fraction was removed from the clarifier, approximately 43 lbs/min of which was recycled to the retention vessel, the remaining 17 lbs going to waste. Of the 43 lbs/min recycled, 41 lbs/min went directly to the retention vessel, while 2 lbs/min went to the retention vessel via a ball mill in a line leading from the clarifier to the retention vessel. The mass average particle size of the solids from the outlet of the ball mill, when in operation, was approximately 30–40 microns.

At the start-up of the system, there was necessarily a low solids inventory. At start-up, the system was operated with the ball mill turned on and, accordingly, the seed crystal concentration passing through the ball mill was in excess of that required for normal operation in order to maintain supersaturation within reasonable limits. When the process had been operated for a time sufficient that enough $SO_2$ had been absorbed and converted into solid sulfite and/or sulfate such that the total solids content of the scrubbing medium in the retention vessel was in the range of 10 percent by weight, the ball mill was turned off to allow the particles to grow to a larger but less reactive size. After the ball mill was turned off, the scrubbing process was continued and the seed crystal reactivity was periodically calculated. In calculating the reactivity, the following equation, set forth in Phillips, J. L., PRECIPITATION KINETICS OF $CaSO_4 \cdot 2H_2$, Paper 1d, presented at the Second International Lime/Limestone Wet Scrubbing Symposium, Sponsored by the EPA, New Orleans, La., Nov. 8–12, 1971, was used.

$$\gamma = \frac{R}{wf}$$

Where:
$\gamma$ is the seed crystal reactivity ($sec^{-1}$)
$R$ is the precipitation rate (moles/sec)
$w$ is the amount of seed in the retention vessel (moles)
$f$ is the precipitation driving force (the difference between the relative saturation and 1) (dimensionless)

As can be seen from the above equation, for a given amount of seed crystals ($w$) and a given precipitation rate ($R$), if the seed reactivity is too small, the driving force ($f$) will increase until scaling occurs, driving force being inversely proportional to the reactivity. Thus, to decrease the driving force, with seed crystal mass held constant, it is necessary to increase the reactivity of the seed crystals. In the process herein, this is accomplished by the introduction into the system of seed crystals in requisite size and number. It will be recognized that the reactivity of a given seed crystal is, among other factors, a function of its size. Accordingly, if in a given system, such as the one under consideration, the number of such sized seed crystals is controlled, the reactivity will be controlled. Since reactivity ultimately controls scaling potential, seed crystal introduction as per the process of the present invention results in a process for controlling scaling. In addition, it also controls the product particle size distribution of the solid product, making the latter easier to dewater or otherwise process, and producing a solid waste more suitable for land fill.

Figure 3:
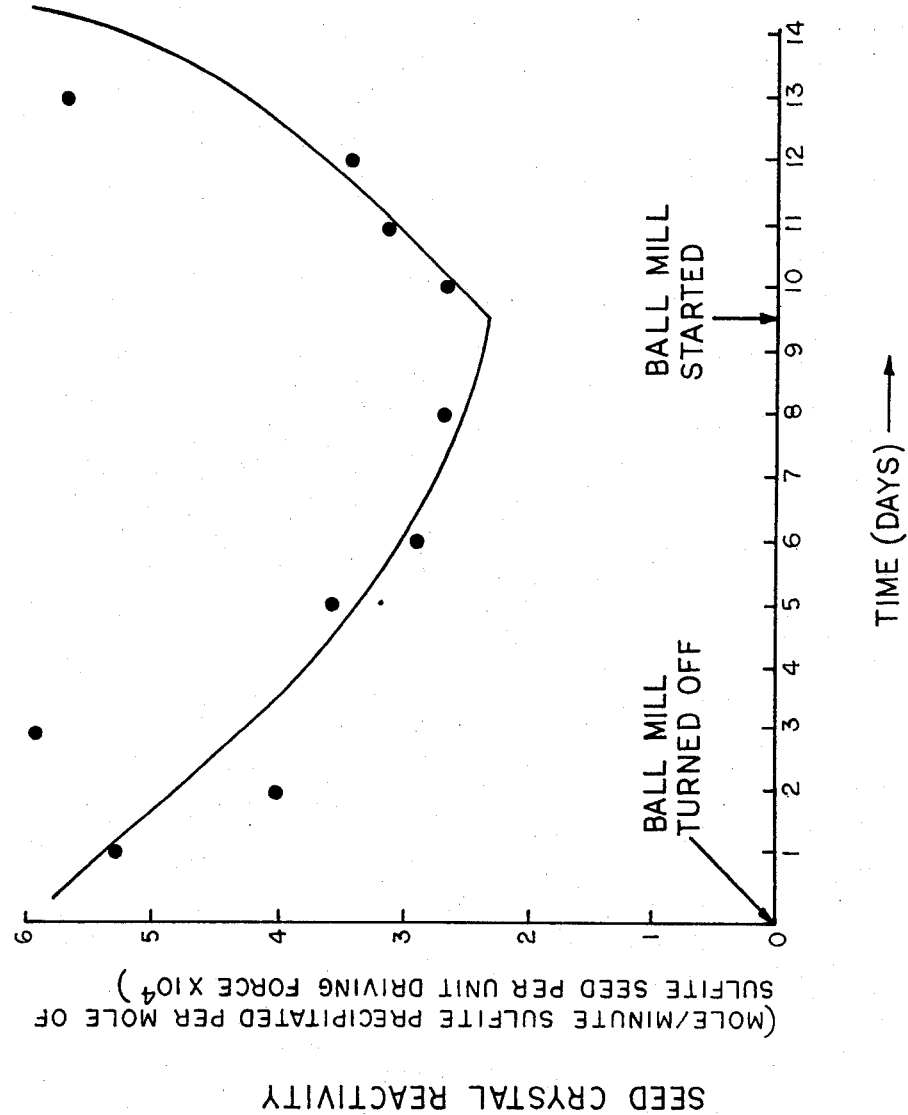
FIG. 3 is a graph showing the effect of using the process and system of the present invention.

With the ball mill turned off, seed crystal size increased with a concomitant decrease in reactivity. When it became apparent that the reactivity had decreased to a point where scaling was imminent, the ball mill was again started and the reactivity of the seed crystals followed. The results are shown graphically in FIG. 3. As is clearly evident from the graph, the introduction of seed crystals via in line grinding in the ball mill of solids being recycled to the retention vessel results in a marked increase in reactivity and hence provides an efficient method for controlling scaling in the system. It should also be noted that the efficiency of the scrubbing process per se was in no way hampered by the seed crystal generation and introduction, the $SO_2$ content of the off gas from the scrubber having been reduced to approximately 375 ppm.

I claim:
1. A process for the removal of sulfur dioxide from gas streams comprising:
   a. passing said gas stream through a gas-liquid scrubbing zone containing a scrubbing medium comprising a reactant which reacts with said sulfur dioxide to form a product selected from the class consisting of sulfites, sulfates and mixtures thereof,
   b. passing said scrubbing medium containing at least some of said product through said scrubbing zone,
   c. introducing seed crystals into a circulation path of at least a fraction of said scrubbing medium, said seed crystals being in number and of a size so as to provide a particle balance to thereby control the level of supersaturation of said product of at least said fraction of said scrubbing medium below a predetermined level and control the particle size of said product,
   d. controlling the rate of introduction of said seed crystals such that the number of seed crystals, including randomly formed seed crystals, in said circulation path is maintained substantially equal to the number of product crystals removed from said circulation path, and
   e. controlling the composition of said scrubbing medium.

2. The process of claim 1 wherein said seed crystals comprise a solid material selected from the class consisting of sulfites, sulfates and mixtures thereof.

3. The process of claim 2 wherein said seed crystals are generated by grinding said solid material.

4. The process of claim 1 wherein said scrubbing medium is passed to a retention zone and said seed crystals are introduced into said retention zone.

5. The process of claim 4 wherein said seed crystals are generated from solid product removed from said retention zone.

6. The process of claim 5 wherein said generation is accomplished by grinding.

7. The process of claim 1 wherein a portion of said product is removed from said scrubbing medium as precipitated solid by passing a portion of said scrubbing medium to a solid-liquid separation zone to produce a solid-rich fraction and a liquid-rich fraction.

8. The process of claim 7 wherein a portion of the solid-rich fraction from said solid-liquid separation zone is subjected to a seed crystal generation zone to produce said seed crystals.

9. The process of claim 8 wherein said seed crystal generation zone employs grinding.

10. The process of claim 1 wherein the reactant in said scrubbing medium comprises a material containing a compound selected from the class consisting of alkaline earth metal carbonates, alkaline earth metal hydroxides, alkaline earth metal oxides and mixtures thereof.

11. The process of claim 4 wherein said scrubbing medium is a slurry and said reactant comprises calcium carbonate.

12. The process of claim 11 wherein said sulfate comprises calcium sulfate and said level of supersaturation with respect to calcium sulfate is controlled such that the supersaturation level of said scrubbing medium leaving said retention zone is less than about 1.2 times saturation concentration.

13. The process of claim 10 wherein said reactant is present in an amount of from about 0.05 to about 4 percent by weight in said scrubbing medium.

14. The process of claim 1 wherein said scrubbing medium is a slurry having a total solids content of from about 2 to about 20 percent by weight.

15. The process of claim 8 wherein the ratio of said portion of said solid-rich fraction subjected to said seed crystal generation zone to a portion of said solid-rich fraction purged from the system ranges from about 1 to 1 to about 1 to 30.

16. The process of claim 15 wherein the average size of said seed crystals produced in said seed crystal generation zone ranges from about 5 to about 40 microns.

17. The process of claim 16 wherein said scrubbing medium is a slurry and said reactant comprises an alkaline earth metal carbonate present in an amount ranging from about 0.05 to about 4 percent by weight of said scrubbing medium and said seed crystals comprise a solid material selected from the class consisting of calcium sulfite, calcium sulfate and mixtures thereof.

* * * * *